US010941692B1

(12) United States Patent
Zhang et al.

(10) Patent No.: US 10,941,692 B1
(45) Date of Patent: Mar. 9, 2021

(54) MIXER ASSEMBLY FOR EXHAUST AFTERTREATMENT SYSTEM (71) Applicant: Tenneco Automotive Operating Company Inc., Lake Forest, IL (US)

(72) Inventors: Yanping Zhang, Ann Arbor, MI (US); Henry Zhang, Ann Arbor, MI (US); Meng-Huang Lu, Ann Arbor, MI (US); Fulun Yang, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/671,221

(22) Filed: Nov. 1, 2019

(51) Int. Cl.
*F01N 1/00* (2006.01)
*F01N 3/28* (2006.01)
*F01N 3/20* (2006.01)
*B01F 5/06* (2006.01)
*B01F 5/04* (2006.01)
*B01F 7/00* (2006.01)

(52) U.S. Cl.
CPC ......... *F01N 3/2892* (2013.01); *F01N 3/2066* (2013.01); *B01F 5/0451* (2013.01); *B01F 5/0616* (2013.01); *B01F 7/00233* (2013.01); *B01F 2005/0639* (2013.01); *F01N 2240/20* (2013.01)

(58) Field of Classification Search
CPC .. F01N 3/2892; F01N 3/2066; F01N 2240/20; B01F 2005/0639; B01F 7/00233; B01F 5/0451
USPC .......................................................... 60/324
See application file for complete search history.

(56) References Cited

U.S. PATENT DOCUMENTS

| 4,217,756 A * | 8/1980 | Laskody ................. F02K 1/386 60/262 |
| 4,848,920 A * | 7/1989 | Heathe .................... B01F 5/064 366/339 |
| 5,916,134 A * | 6/1999 | Yang ..................... F01N 3/2892 60/299 |
| 6,258,144 B1 | 7/2001 | Huang |
| 6,745,562 B2 * | 6/2004 | Berriman .............. F01N 3/2892 181/225 |
| 6,796,296 B2 | 9/2004 | Kim |

(Continued)

FOREIGN PATENT DOCUMENTS

| CN | 2334879 | 8/1999 |
| CN | 2596052 | 12/2003 |

(Continued)

*Primary Examiner* — Jason D Shanske
(74) *Attorney, Agent, or Firm* — McGarry Bair PC (57) ABSTRACT

A mixer assembly for an exhaust aftertreatment system includes a first support ring. The first support ring defines a plurality of first slots angularly spaced apart from each other. A second support ring spaced apart from the first support ring defines a plurality of second slots angularly spaced apart from each other. A plurality of blades extends between the first support ring and the second support ring. Each of the plurality of blades is coupled to each of the first support ring and the second support ring. Each of the plurality of blades includes a base. The base includes a first connecting portion engaged with a corresponding first slot from the plurality of first slots and a second connecting portion engaged with a corresponding second slot from the plurality of second slots. At least one tab extends outwardly from the base at an angle relative to the base.

19 Claims, 7 Drawing Sheets

(56) References Cited

U.S. PATENT DOCUMENTS

| | | | |
|---|---|---|---|
| 6,840,212 B2 | 1/2005 | Kim | |
| 6,932,049 B2 | 8/2005 | Kim | |
| 7,028,663 B1 | 4/2006 | Kim | |
| 7,543,561 B2 * | 6/2009 | Shibata | B01D 45/16 |
| | | | 123/306 |
| 7,793,494 B2 * | 9/2010 | Wirth | B01F 5/0618 |
| | | | 60/324 |
| 7,805,932 B2 | 10/2010 | Oxborrow | |
| 8,910,470 B2 | 12/2014 | Moetakef et al. | |
| 8,960,146 B2 | 2/2015 | Chen et al. | |
| 10,113,468 B2 | 10/2018 | Middleton, Jr. | |
| 2002/0162322 A1 * | 11/2002 | Ganzmann | F01N 3/2066 |
| | | | 60/286 |
| 2010/0293931 A1 * | 11/2010 | Peters | B01D 53/9431 |
| | | | 60/324 |
| 2014/0334988 A1 * | 11/2014 | Stanavich | F01N 3/2892 |
| | | | 422/177 |
| 2015/0101311 A1 * | 4/2015 | Keen | H05K 7/20436 |
| | | | 60/274 |
| 2016/0032809 A1 * | 2/2016 | Kobe | B01F 5/0616 |
| | | | 60/324 |
| 2016/0194995 A1 * | 7/2016 | Weiss | B01F 5/0451 |
| | | | 60/324 |
| 2020/0206700 A1 * | 7/2020 | Seal | B01F 5/0405 |
| 2020/0263590 A1 * | 8/2020 | Sauer | B01F 5/0616 |

FOREIGN PATENT DOCUMENTS

| | | |
|---|---|---|
| CN | 202493335 | 10/2012 |
| CN | 202645722 | 1/2013 |
| CN | 104153871 | 11/2014 |
| CN | 204253167 | 4/2015 |
| CN | 205955864 | 2/2017 |
| DE | 102007012790 | 7/2009 |
| KR | 20090131755 | 12/2009 |
| KR | 101885754 | 8/2018 |
| KR | 101921023 | 11/2018 |

* cited by examiner

MIXER ASSEMBLY FOR EXHAUST AFTERTREATMENT SYSTEM

TECHNICAL FIELD

The present disclosure relates to an exhaust aftertreatment system. More particularly, the present disclosure relates to a mixer assembly for the exhaust aftertreatment system.

BACKGROUND

Lean burn engines provide improved fuel efficiency by operating with an excess of oxygen, that is, a quantity of oxygen that is greater than the amount necessary for complete combustion of the available fuel. Such engines are said to run "lean" or on a "lean mixture." However, this improved or increase in fuel economy, as opposed to non-lean burn combustion, is offset by undesired pollution emissions, specifically in the form of oxides of nitrogen (NOx).

One method used to reduce NOx emissions from lean burn internal combustion engines is known as selective catalytic reduction (SCR). SCR, when used, for example, to reduce NOx emissions from a diesel engine, involves injecting an atomized reagent into the exhaust stream of the engine in relation to one or more selected engine operational parameters, such as exhaust gas temperature, engine revolutions per minute (RPM) or engine load as measured by engine fuel flow, turbo boost pressure or exhaust NOx mass flow. Typically, an injector is used for injecting the reagent into the exhaust stream of the engine.

During injection of such a reagent, it is vital for the reagent to atomize properly to ensure mixing with the exhaust gases. A static mixer may be used in conjunction with the injector for reagent. Typically, various parts of the mixer are interconnected by welding. However, it is observed that mostly durability failures occur near weld locations due to weld induced stress concentration and material defect. Moreover, imperfect surfaces resulting from welding process increases the risk of solid urea deposit. Thus, a mixing assembly with improved structural features is required.

SUMMARY

In an aspect of the present disclosure, a mixer assembly for an exhaust aftertreatment system is provided. The exhaust aftertreatment system has a housing which receives exhaust gases. The mixer assembly includes a first support ring defining a longitudinal axis. The first support ring has a first end at least partially and fixedly coupled to the housing and a second end defining a plurality of first slots angularly spaced apart from each other. The mixer assembly further includes a second support ring spaced apart from the first support ring along the longitudinal axis. The second support ring has a first end at least partially and fixedly coupled to the housing and a second end defining a plurality of second slots angularly spaced apart from each other. The mixer assembly further includes a plurality of blades extending between the first support ring and the second support ring. Each of the plurality of blades is removably coupled to each of the first support ring and the second support ring. Each of the plurality of blades includes a base. The base includes a first connecting portion engaged with a corresponding first slot from the plurality of first slots. The base includes a second connecting portion engaged with a corresponding second slot from the plurality of second slots. Further, the base includes at least one tab extending outwardly from the base at an angle relative to the base.

In another aspect of the present disclosure, an exhaust aftertreatment system is provided. The exhaust aftertreatment system has a housing which receives exhaust gases from a combustion engine. The exhaust aftertreatment system includes a mixer assembly disposed within the housing. The mixer assembly includes a first support ring defining a longitudinal axis and fixedly coupled to the housing. The first support ring defines a plurality of first slots angularly spaced apart from each other. The mixer assembly further includes a second support ring spaced apart from the first support ring along the longitudinal axis and fixedly coupled to the housing. The second support ring defines a plurality of second slots angularly spaced apart from each other. The mixer assembly further includes a plurality of blades extending between the first support ring and the second support ring. Each of the plurality of blades is removably coupled to each of the first support ring and the second support ring. Each of the plurality of blades includes a base. The base includes a first connecting portion engaged with a corresponding first slot from the plurality of first slots. The base includes a second connecting portion engaged with a corresponding second slot from the plurality of second slots. Further, the base includes at least one tab extending outwardly from the base at an angle relative to the base.

In yet another aspect of the present disclosure, a mixer assembly for an exhaust aftertreatment system is provided. The exhaust aftertreatment system has a housing which receives exhaust gases. The mixer assembly includes a first support ring defining a longitudinal axis and fixedly coupled to the housing. The first support ring defines a plurality of first slots angularly spaced apart from each other. The mixer assembly further includes a second support ring spaced apart from the first support ring along the longitudinal axis and fixedly coupled to the housing. The second support ring defines a plurality of second slots angularly spaced apart from each other. The mixer assembly further includes a plurality of blades extending between the first support ring and the second support ring. Each of the plurality of blades is removably coupled to each of the first support ring and the second support ring. Each of the plurality of blades includes a base defining a first counter slot engaged with a corresponding first slot from the plurality of first slots and a second counter slot engaged with a corresponding second slot from the plurality of second slots. The base includes at least one first tab extending outwardly from the base. The base further includes at least one second tab extending outwardly from the base. The at least one first tab and the at least one second tab extend towards opposite sides of the base.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

Figure 1:
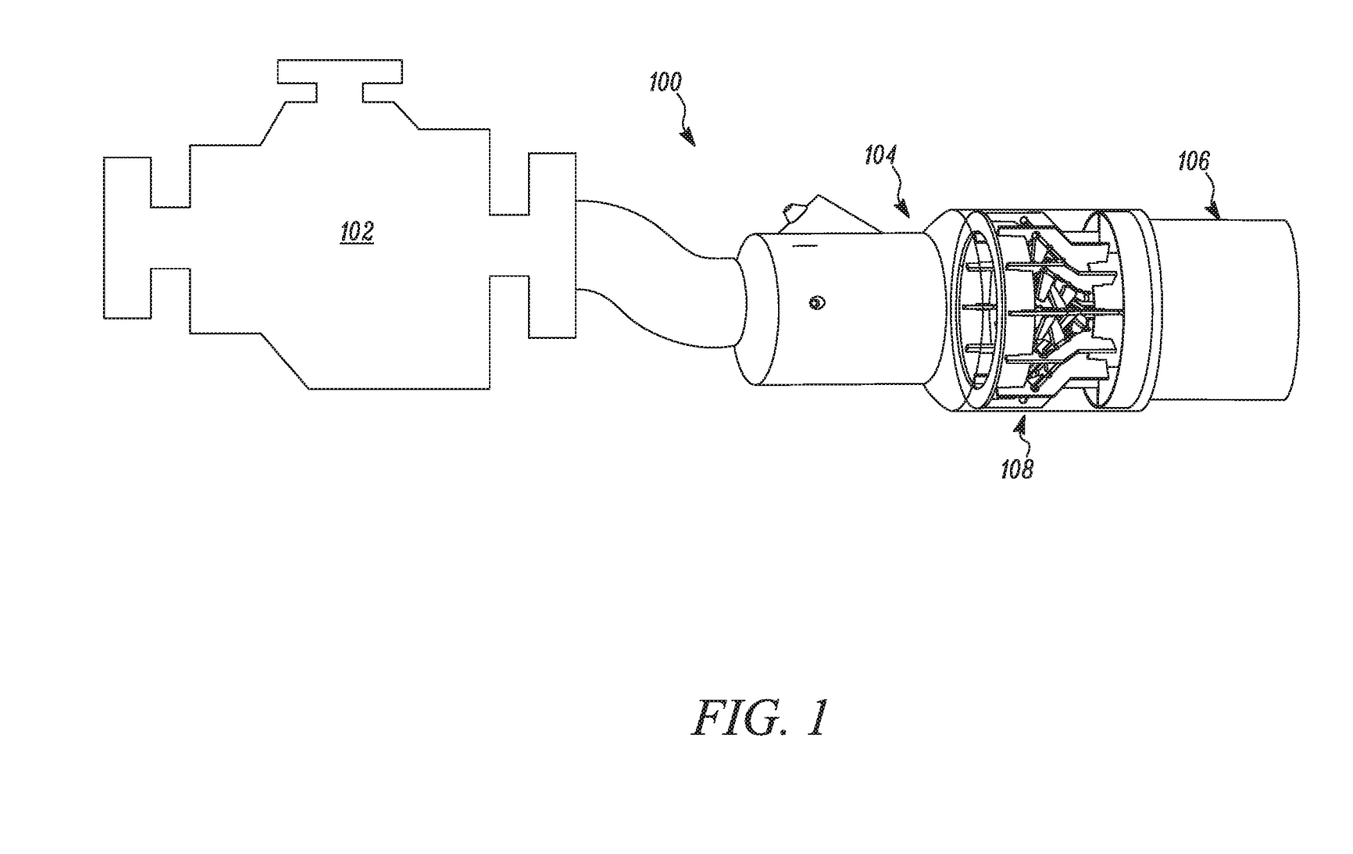
FIG. 1 illustrates an exhaust aftertreatment system, in accordance with an embodiment of the present disclosure.

The following description of the preferred embodiment(s) is merely exemplary in nature and is in no way intended to limit the invention, its application, or uses. Referring now to the drawings in which like reference numerals designate like or corresponding parts throughout the several views, there is shown in FIG. 1 an exhaust aftertreatment system 100. The exhaust aftertreatment system 100 will be hereinafter interchangeably referred to as the "system 100". The system 100 is fluidly coupled to a combustion engine 102. The combustion engine 102 may be any internal combustion engine powered by a fuel, such as diesel, gasoline, natural gas, and/or a combination thereof. Accordingly, the system 100 receives exhaust gas generated by the combustion engine 102.

The system 100 includes a housing 104 which receives exhaust gases from the combustion engine 102. The system 100 includes a number of downstream exhaust components (not shown) disposed within the housing 104. The exhaust components may be mounted in various different configurations and combinations based on application requirements and/or available packaging space. The exhaust components are adapted to receive the exhaust gas from the combustion engine 102 and direct the exhaust gas to the external atmosphere via a tailpipe 106. The exhaust components are adapted to reduce emissions and control noise.

The system 100 may include an oxidation catalyst (e.g., a diesel oxidation catalyst or DOC) (not shown), a filter (e.g., a diesel particulate filter (DPF)) (not shown), a mixer assembly 108 and a selective catalytic reduction (SCR) catalyst (not shown). The DOC, the filter, the mixer assembly 108 and the SCR catalyst are disposed within the housing 104 such that some or all of the exhaust gas output from the combustion engine 102 flows therethrough. A hydrocarbon (HC) injector (not shown) may be disposed at least partially within the housing 104 upstream of the DOC. The HC injector may receive hydrocarbon fuel from a fuel source and may inject fuel into the stream of exhaust gas upstream of the DOC.

A burner (not shown) may be disposed at least partially within the housing 104 upstream of the DOC at or adjacent the HC injector. The burner may ignite the fuel injected by the HC injector to regenerate the DOC and/or the filter. A reductant injector (not shown) may be disposed adjacent to or partially within the mixer assembly 108 upstream of the SCR catalyst. The reductant injector may receive a reductant (e.g., urea) from a reductant tank and inject the reductant into an exhaust stream in the mixer assembly 108. The reductant may mix with exhaust gas within the mixer assembly 108 prior to flowing through the SCR catalyst.

Figure 2:
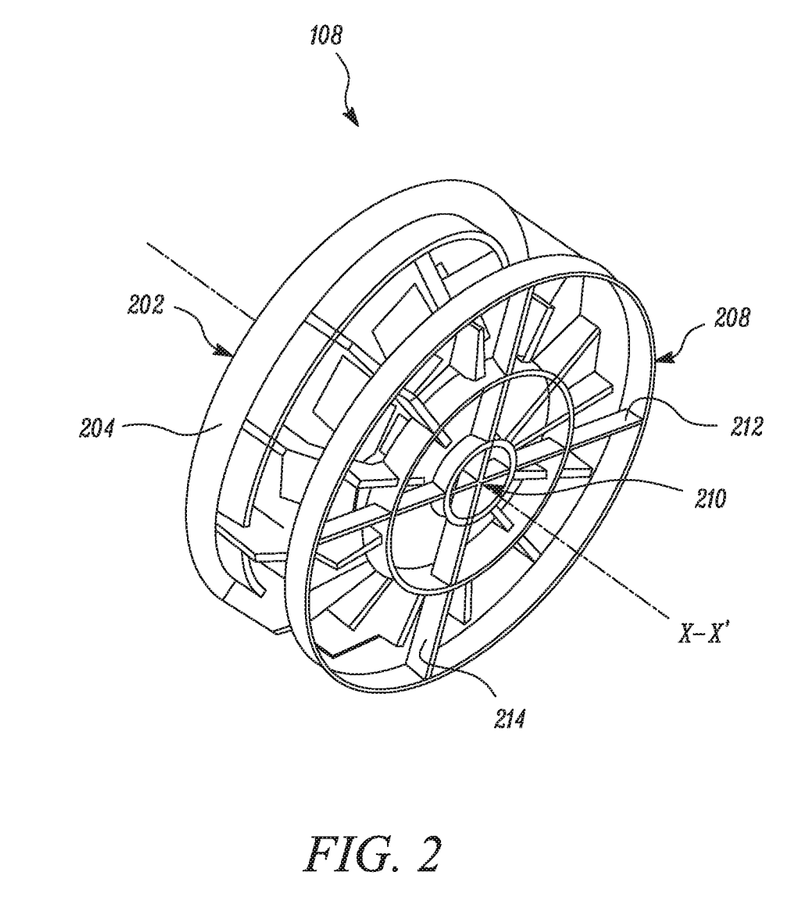
FIG. 2 illustrates a perspective view of a mixer assembly for the exhaust aftertreatment system shown in FIG. 1, in accordance with an embodiment of the present disclosure.
Figure 3:
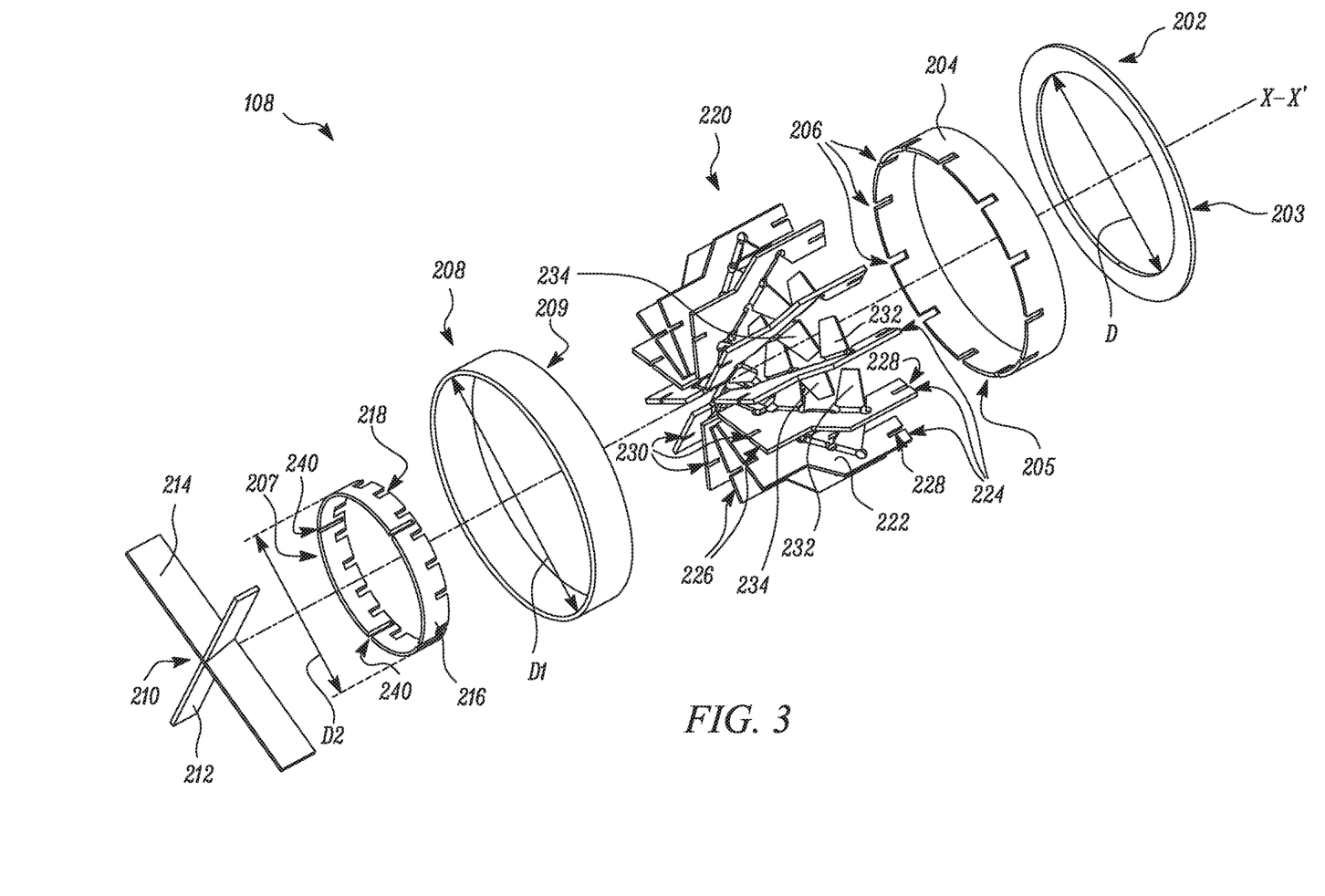
FIG. 3 illustrates an exploded view of the mixer assembly of FIG. 2, in accordance with an embodiment of the present disclosure.

The system 100 further includes a mixer assembly 108 disposed within the housing 104. The mixer assembly 108 is disposed within the housing 104 such that a substantial volume of the exhaust gases passing through the housing 104 passes through the mixer assembly 108. FIG. 2 shows a perspective view of the mixer assembly 108 and FIG. 3 shows an exploded view of the mixer assembly 108. With combined reference to FIGS. 2 and 3, the mixer assembly 108 includes a first support ring 202. The first support ring 202 defines a longitudinal axis X-X' along its length. The first support ring 202 has a first end 203 at least partially and fixedly coupled to the housing 104 (shown in FIG. 1). In an embodiment, the first support ring 202 is fixedly coupled to the housing 104 through welding. It should be contemplated that the first support ring 202 may be fixedly coupled to the housing 104 through any other suitable joining method which may be applicable with various aspects of the present disclosure. The first support ring 202 further includes a flange 204 coupled to the first support ring 202. The flange 204 may be coupled to the first support ring 202 through any suitable mechanical joining method which may be applicable with various aspects of the present disclosure.

The first support ring 202 has a second end 205 which defines a plurality of first slots 206 angularly spaced apart from each other. More specifically, the flange 204 defines the plurality of first slots 206. The plurality of first slots 206 may include any number of first slots 206 disposed along the flange 204. Each first slot 206 from the plurality of first slots 206 has a substantially rectangular shape. Each first slot 206 from the plurality of first slots 206 may have any other suitable shape as well which may be applicable with various aspects of the present disclosure.

The mixer assembly 108 includes a second support ring 208 spaced apart from the first support ring 202 along the longitudinal axis X-X'. The second support ring 208 has a first end 207 at least partially and fixedly coupled to the housing 104. In an embodiment, the second support ring 208 is coupled to the housing 104 through welding. It should be contemplated that the second support ring 208 may be fixedly coupled to the housing 104 through any suitable joining method which may be applicable with various aspects of the present disclosure. The second support ring 208 includes a cross-member 210 disposed within the second support ring 208. The cross-member 210 has a first member 212 and a second member 214 disposed within the second support ring 208. The first member 212 and the second member 214 are disposed orthogonal to each other within the second support ring 208. In an embodiment, the first member 212 and the second member 214 may be disposed at any other angle relative to each other.

The second support ring 208 further includes an auxiliary support ring 216. The auxiliary support ring 216 is provided towards a second end 209 of the second support ring 208. The auxiliary support ring 216 is disposed concentrically with the second support ring 208. A diameter of the second support ring 208 towards the second end 209 is defined as a diameter D2 of the auxiliary support ring 216. The auxiliary support ring 216 has a diameter D2 smaller than a diameter D1 of the second support ring 208. The auxiliary support ring 216 defines openings 240 to allow the cross-member 210 to fit within the second support ring 208 along with the auxiliary support ring 216. In an embodiment, a diameter D of the first support ring 202 at the second end 205 is larger than a diameter D2 of the second support ring 208 at the second end 209.

The second support ring 208 has a second end 209 which defines a plurality of second slots 218 angularly spaced apart from each other. The plurality of second slots 218 may include any number of second slots 218 disposed along the second support ring 208. More specifically, the auxiliary support ring 216 defines the plurality of second slots 218. Each second slot 218 from the plurality of second slots 218 has a substantially rectangular shape. Each second slot 218 from the plurality of second slots 218 may have any other suitable shape as well which may be applicable with various aspects of the present disclosure. The auxiliary support ring 216 and the cross-member 210 further help in mixing of the exhaust gases by providing hindrance in flow path of the exhaust gases.

In an embodiment, the second support ring 208 may also be contemplated without the auxiliary support ring 216 and the cross-member 210. The plurality of second slots 218 may be defined on the second support ring 208. It should be contemplated that various other structural embodiments of the second support ring 208 may also be envisioned which may be applicable with various aspects of the present disclosure. The mixer assembly 108 further includes a plurality of blades 220. The plurality of blades 220 extends between the first support ring 202 and the second support ring 208. Each blade 220 from the plurality of blades 220 is removably coupled to each of the first support ring 202 and the second support ring 208. It should be contemplated that the mixer assembly 108 may include any number of blades 220, and the present disclosure is not limited by number of blades 220 in any manner. Each blade 220 from the plurality of blades 220 includes a base 222. In the illustrated embodiment, the base 222 has a planar shape extending along the longitudinal axis X-X'. In another embodiment, the base 222 may have a non-planar shape.

The base 222 has a first connecting portion 224 and a second connecting portion 226. The first connecting portion 224 is engaged with a corresponding first slot 206 from the plurality of first slots 206. In the illustrated embodiment, the first connecting portion 224 defines a first counter slot 228 which engages with the corresponding first slot 206 from the plurality of first slots 206. In another embodiment, the first connecting portion 224 may be a tab which engages with the corresponding first slot 206 from the plurality of first slots 206.

The second connecting portion 226 is engaged with a corresponding second slot 218 from the plurality of second slots 218. In the illustrated embodiment, the second connecting portion 226 defines a second counter slot 230 which engages with the corresponding second slot 218 from the plurality of second slots 218. In another embodiment, the second connecting portion 226 may be a tab which engages with the corresponding second slot 218 from the plurality of second slots 218.

Further, each blade 220 from the plurality of blades 220 includes at least one tab extending outwardly from the base 222 at an angle relative to the base 222. In the illustrated embodiment, the at least one tab includes at least one first tab 232 and at least one second tab 234. The at least one first tab 232 and the at least one second tab 234 extend towards opposite sides of the base 222. The at least one first tab 232 and the at least one second tab 234 are disposed axially spaced apart from each other along the longitudinal axis X-X'. The at least one tab has a trapezoidal shape. Specifically, each of the first tab 232 and the second tab 234 has a trapezoidal shape. The at least one first tab 232 and the at least one second tab 234 are axially spaced apart from each other along the longitudinal axis X-X'. Relative distance along the longitudinal axis X-X' between the first tab 232 and the second tab 234 may be adjusted as per application requirements.

Figure 4:
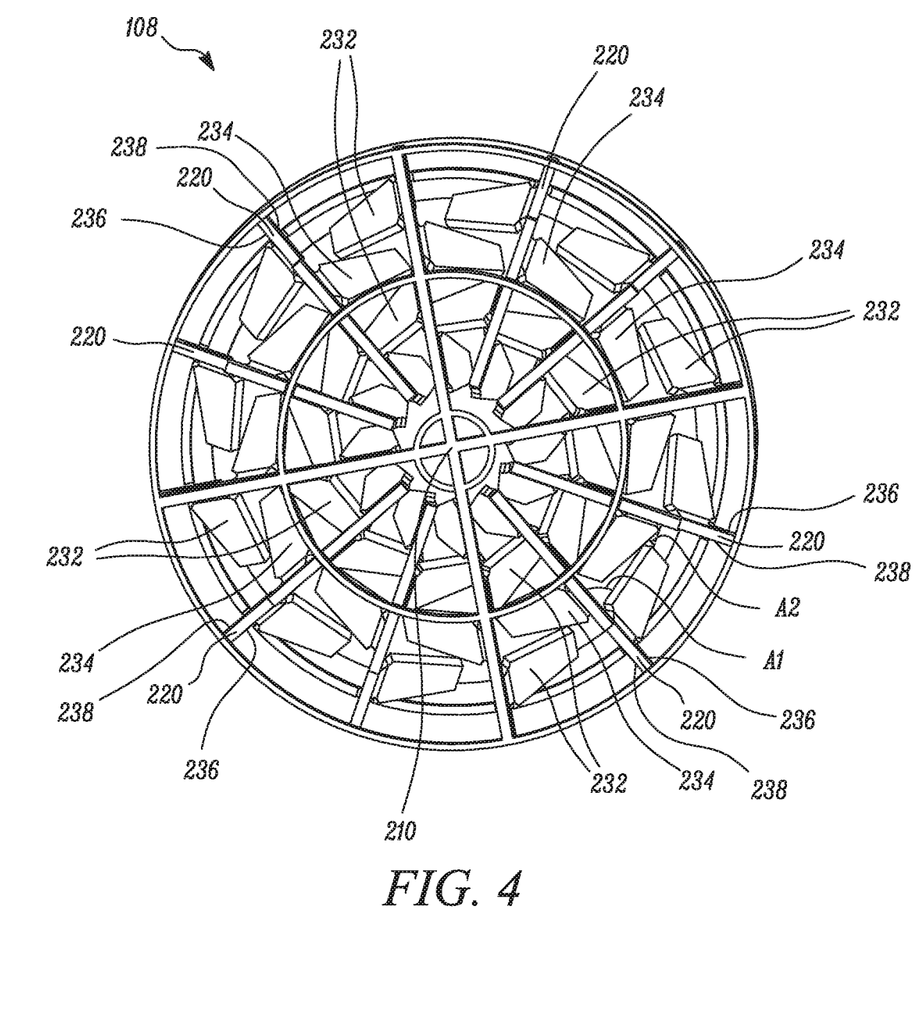
FIG. 4 illustrates a rear view of the mixer assembly of FIG. 2, in accordance with an embodiment of present disclosure.

FIG. 4 illustrates a rear view of the mixer assembly 108. Each blade 220 from the plurality of blades 220 is shown as having at least one first tab 232 and at least one second tab 234. The at least one first tab 232 may include one or more first tabs 232. The at least one second tab 234 may include one or more second tabs 234. The first tab 232 and the second tab 234 extend towards opposite sides of the base 222. The base 222 has a first side 236 and a second side 238. The first tab 232 extends towards the first side 236 and the second tab 234 extends towards the second side 238.

The first tab 232 and the second tab 234 may extend in any suitable angular orientation relative to the base 222. The first tab 232 extends at an angle $A_1$ relative to the base 222 and the second tab 234 extends at an angle $A_2$ relative to the base 222. In an embodiment, the angle $A_1$ may be substantially equal to the angle $A_2$. It should be noted that the value of angles $A_1$, $A_2$ may be suitably changed to provide for a more staggered configuration of the plurality of blades 220. In another embodiment, the angle $A_1$ may be different from the angle $A_2$. In an embodiment, the first tab 232 and the second tab 234 have a planar shape. In another embodiment, the first tab 232 and the second tab 234 may have a non-planar shape. The first tab 232 and the second tab 234 may have similar or dissimilar sizes. It should be noted that the shape, size and orientation of the blades 220 and the first and second tabs 232, 234 may be varied as per application requirements.

Figure 5:
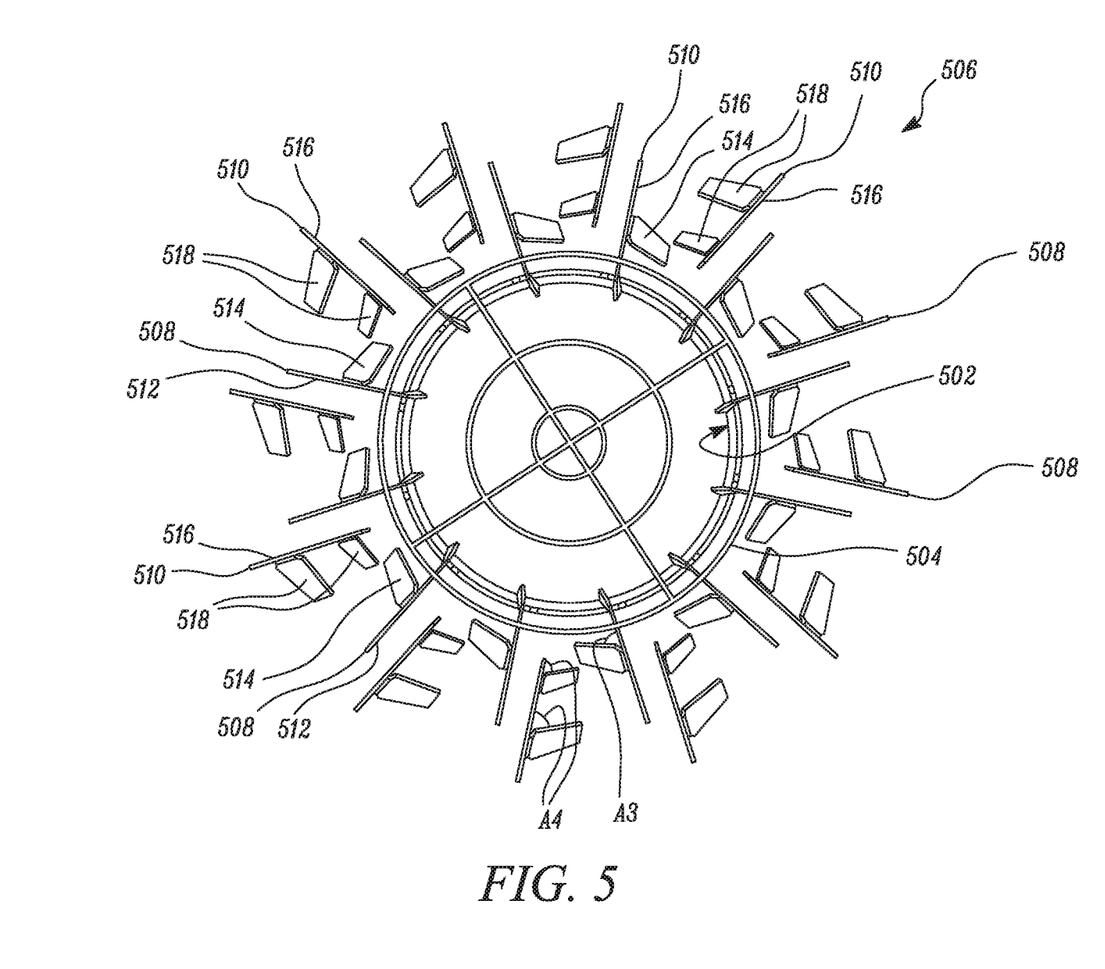
FIG. 5 illustrates another mixer assembly having a first set of blades and a second set of blades, in accordance with an embodiment of the present disclosure.

FIG. 5 shows another embodiment of the present disclosure. A mixer assembly 500 includes a first support ring 502, a second support ring 504 and a plurality of blades 506 extending between the first support ring 502 and the second support ring 504. The plurality of blades 506 includes a set of first blades 508 and a set of second blades 510. The set of first blades 508 includes multiple first blades 508. Each first blade 508 from the set of first blades 508 has a first base 512. At least one first tab 514 extends from the first base 512 at a first angle $A_3$ relative to the first base 512. In the illustrated embodiment, the at least one first tab 514 includes one first tab 514. Similarly, the set of second blades 510 includes multiple second blades 510. Each second blade 510 from the set of second blades 510 has a second base 516. At least one second tab 518 extends from the second base 516 at a second angle $A_4$ relative to the second base 516. In the illustrated embodiment, the at least one second tab 518 includes two second tabs 518. The two second tabs 518 may extend relative to the second base 516 at similar or different angular orientations. In an embodiment, the first blade 508 and the second blade 510 may be disposed adjacent to each other. The first tabs 514 and the second tabs 518 may extend in opposite directions to each other. In an embodiment, the first blade 508 and the second blade 510 may be disposed in a single slot on the first support ring 502. In another embodiment, the first blade 508 and the second blade 510 may be disposed in adjacent slots on the first support ring 502. The present disclosure is not limited by any such limitation on relative orientation of the second tabs 518.

Figure 6A:
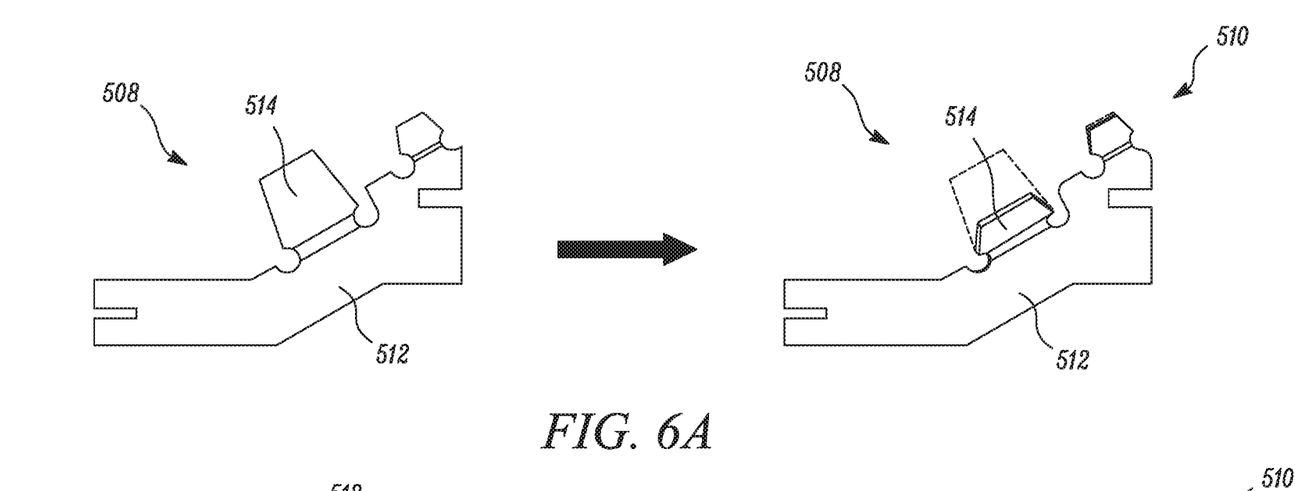
FIG. 6A illustrates exemplary manufacturing steps for the first set of blades of the mixer assembly.
Figure 6B:
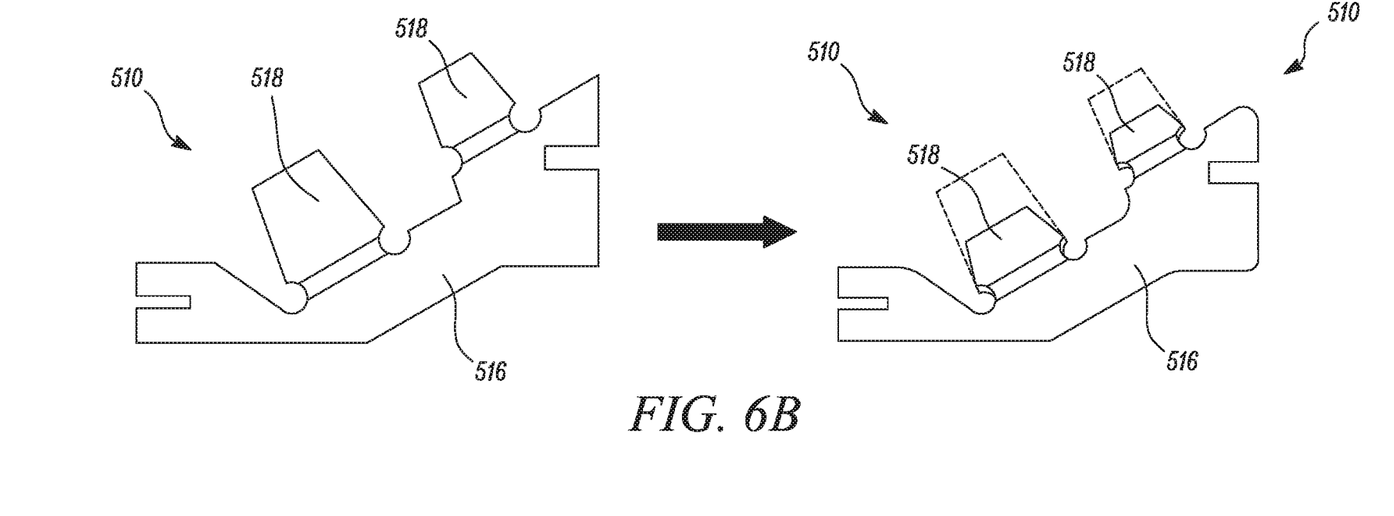
FIG. 6B illustrates exemplary manufacturing steps for the second set of blades of the mixer assembly.

FIG. 6A shows a first blade 508 from the set of first blades 508. The first base 512 initially has a planar shape. Afterwards, a portion of the first base 512 defining the first tab 514 is bent so that the first tab 514 extends at the first angle $A_3$ relative to the first base 512. Similarly, FIG. 6B shows a second blade 510 from the set of second blades 510. The second base 516 initially has a planar shape. Afterwards, at least one portion of the second base 516 defining the at least one second tab 518 is bent so that the second tab 518 extends at the second angle $A_4$ relative to the second base 516. In the illustrated embodiment, the at least one second tab 518 includes two second tabs 518. It should be noted that the value of angles $A_3$, $A_4$ may be suitably changed to provide for a more staggered configuration of the plurality of blades 506.

The mixer assembly 108 provided by the present disclosure couples the plurality of blades 220 with the first support ring 202 and the second support ring 208 in a press-fit manner. The blades 220 may have counter slots to couple with the first and second slots 206, 218, or the blades 220 may define tab portions to couple with the first and second slots 206, 218. Thus, the blades 220 are coupled with other components of the mixer assembly without using welding as a means of connection. The mixer assembly 108 may have improved structural integrity and durability by avoiding weld induced defects and failures including solid urea deposits. The mixer assembly 108 may therefore exhibit high NVH performance, low back pressure, excellent velocity uniformity, and a compact structure.

Figure 6C:
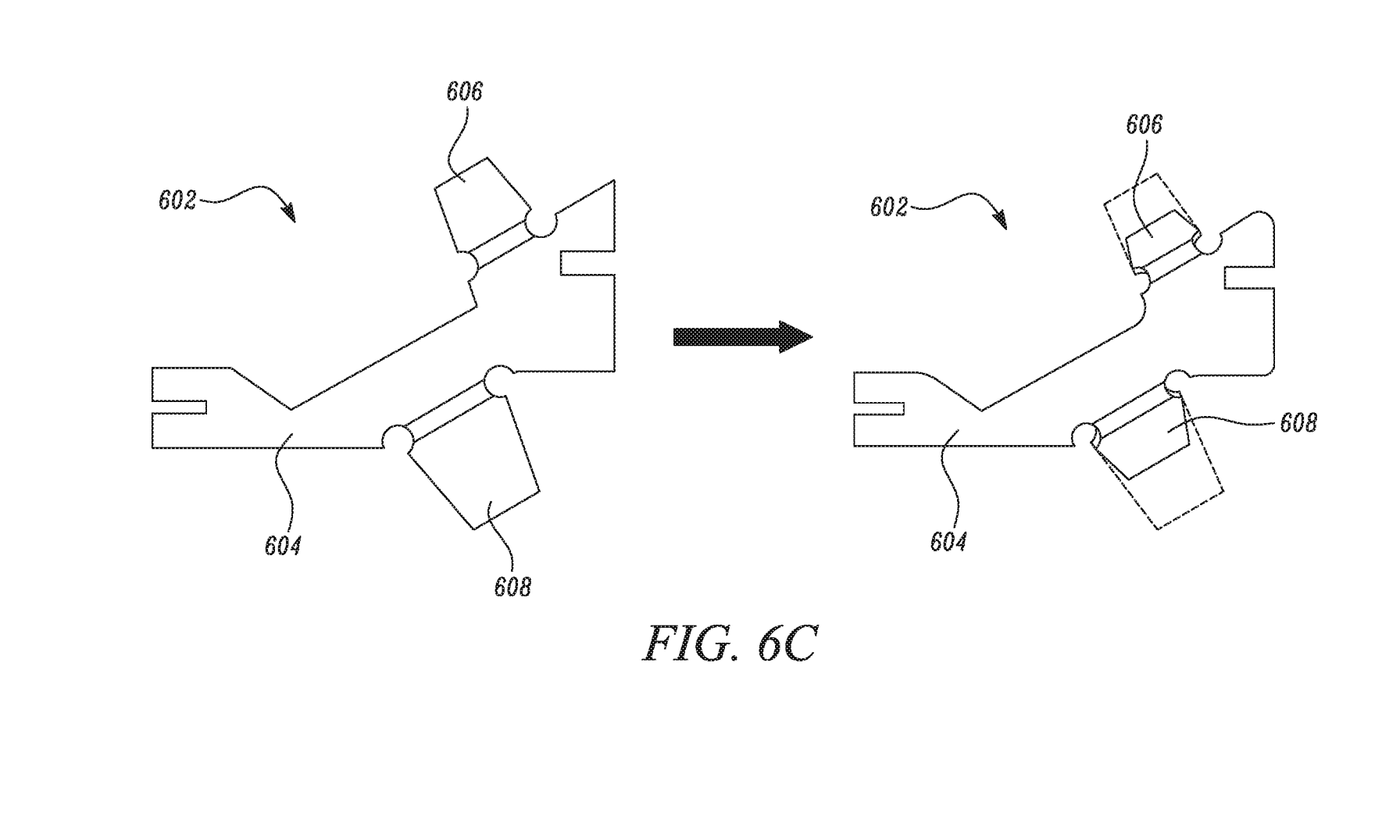
FIG. 6C illustrates exemplary manufacturing steps for another set of blades of the mixer assembly.

FIG. 6C shows another embodiment for the set of blades 602. The set of blades 602 may be any one of the set of first blades 508 and the set of second blades 510. The set of blades 602 includes a generally planar base portion 604. Multiple tabs may extend from the base portion 604. In the illustrated embodiment, a first tab 606 and a second tab 608 extend from the base portion 604. The first tab 606 and the second tab 608 extend from opposite sides of the base portion 604 and extend away from each other. In the illustrated embodiment, the first tab 606 extends from an upper side of the base portion 604 and the second tab 608 extends from a lower side of the base portion 604. The base portion 604 initially has a planar shape. Afterwards, at least one portion of the base portion 604 is bent so that the first tab 606 and the second tab 608 extend angularly relative to the base portion 604.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mixer assembly for an exhaust aftertreatment system having a housing that receives exhaust gases, the mixer assembly comprising:
    a first support ring defining a longitudinal axis, the first support ring having a first end at least partially and fixedly coupled to the housing and a second end defining a plurality of first slots angularly spaced apart from each other;
    a second support ring spaced apart from the first support ring along the longitudinal axis, the second support ring having a first end at least partially and fixedly coupled to the housing and a second end defining a plurality of second slots angularly spaced apart from each other;
    a plurality of blades extending between the first support ring and the second support ring, each of the plurality of blades removably coupled to each of the first support ring and the second support ring, each of the plurality of blades comprising:
        a base comprising:
            a first connecting portion defining a first counter slot engaged with a corresponding first slot from the plurality of first slots; and
            a second connecting portion defining a second counter slot engaged with a corresponding second slot from the plurality of second slots; and
            at least one tab extending outwardly from the base at an angle relative to the base.

2. The mixer assembly of claim 1, wherein each first slot from the plurality of first slots has a rectangular shape.

3. The mixer assembly of claim 1, wherein each second slot from the plurality of second slots has a rectangular shape.

4. The mixer assembly of claim 1, wherein the base has a planar shape extending along the longitudinal axis.

5. The mixer assembly of claim 1, wherein the at least one tab includes at least one first tab and at least one second tab, wherein the at least one first tab and the at least one second tab extend towards opposite sides of the base.

6. The mixer assembly of claim 5, wherein the at least one first tab and the at least one second tab are axially spaced apart from each other along the longitudinal axis.

7. The mixer assembly of claim 1, wherein the at least one tab has a trapezoidal shape.

8. The mixer assembly of claim 1, wherein a diameter of the first support ring at the second end is larger than a diameter of the second support ring at the second end.

9. The mixer assembly of claim 1, wherein the second support ring further includes a cross-member disposed within the second support ring.

10. An exhaust aftertreatment system comprising:
    a housing configured to receive exhaust gases from a combustion engine; and
    a mixer assembly disposed within the housing, the mixer assembly including:
        a first support ring defining a longitudinal axis and fixedly coupled to the housing, the first support ring defining a plurality of first slots angularly spaced apart from each other;
        a second support ring spaced apart from the first support ring along the longitudinal axis and fixedly coupled to the housing, the second support ring defining a plurality of second slots angularly spaced apart from each other;
        a plurality of blades extending between the first support ring and the second support ring, each of the plurality of blades removably coupled to each of the first support ring and the second support ring, each of the plurality of blades comprising:
            a base defining:
                a first connecting portion defining a first counter slot engaged with a corresponding first slot from the plurality of first slots; and
                a second connecting portion defining a second counter slot engaged with a corresponding second slot from the plurality of second slots; and
                at least one tab extending outwardly from the base at an angle relative to the base.

11. The exhaust aftertreatment system of claim 10, wherein the base has a planar shape extending along the longitudinal axis.

12. The exhaust aftertreatment system of claim 10, wherein the at least one tab includes at least one first tab and at least one second tab, wherein the at least one first tab and the at least one second tab extend towards opposite sides of the base.

13. The exhaust aftertreatment system of claim 12, wherein the at least one first tab and the at least one second tab are axially spaced apart from each other along the longitudinal axis.

14. The exhaust aftertreatment system of claim 10, wherein the at least one tab has a trapezoidal shape.

15. A mixer assembly for an exhaust aftertreatment system having a housing that receives exhaust gases, the mixer assembly comprising:
- a first support ring defining a longitudinal axis and fixedly coupled to the housing, the first support ring defining a plurality of first slots angularly spaced apart from each other;
- a second support ring spaced apart from the first support ring along the longitudinal axis and fixedly coupled to the housing, the second support ring defining a plurality of second slots angularly spaced apart from each other;
- a plurality of blades extending between the first support ring and the second support ring, each of the plurality of blades removably coupled to each of the first support ring and the second support ring, each of the plurality of blades comprising:
  - a base defining:
    - a first counter slot engaged with a corresponding first slot from the plurality of first slots; and
    - a second counter slot engaged with a corresponding second slot from the plurality of second slots; and
  - at least one first tab extending outwardly from the base; and
  - at least one second tab extending outwardly from the base, wherein the at least one first tab and the at least one second tab extend towards opposite sides of the base.

16. The mixer assembly of claim 15, wherein the at least one first tab and the at least one second tab are axially spaced apart from each other along the longitudinal axis.

17. The mixer assembly of claim 15, wherein the base has a planar shape extending along the longitudinal axis.

18. The mixer assembly of claim 15, wherein the at least one first tab has a trapezoidal shape.

19. The mixer assembly of claim 15, wherein the at least one second tab has a trapezoidal shape.

* * * * *